United States Patent
Welten et al.

(10) Patent No.: US 10,172,196 B2
(45) Date of Patent: Jan. 1, 2019

(54) LIGHT UNIT DRIVER SYSTEM

(71) Applicant: ELDOLAB HOLDING B.V., Son en Breugel (NL)

(72) Inventors: Petrus Johannes Maria Welten, Oss (NL); Marc Saes, Eindhoven (NL)

(73) Assignee: ELDOLAB HOLDING B.V., Son En Breugel (NL)

( * ) Notice: Subject to any disclaimer, the term of this patent is extended or adjusted under 35 U.S.C. 154(b) by 216 days.

(21) Appl. No.: 15/315,177

(22) PCT Filed: Jun. 2, 2015

(86) PCT No.: PCT/EP2015/062293
§ 371 (c)(1),
(2) Date: Nov. 30, 2016

(87) PCT Pub. No.: WO2015/185570
PCT Pub. Date: Dec. 10, 2015

(65) Prior Publication Data
US 2017/0202063 A1    Jul. 13, 2017

(30) Foreign Application Priority Data

Jun. 2, 2014   (NL) .................................... 2012930

(51) Int. Cl.
*H02J 9/06*       (2006.01)
*H05B 33/08*    (2006.01)
(Continued)

(52) U.S. Cl.
CPC ........ *H05B 33/0815* (2013.01); *H02J 7/0068* (2013.01); *H02J 7/022* (2013.01);
(Continued)

(58) Field of Classification Search
CPC .. H02J 7/0068; H02J 7/022; H02J 9/04; H02J 9/06; H02J 9/061; H02J 9/065;
(Continued)

(56) References Cited

U.S. PATENT DOCUMENTS

2009/0195165 A1    8/2009  Yang
2010/0295472 A1    11/2010 Wibben et al.
(Continued)

FOREIGN PATENT DOCUMENTS

WO        2013177980 A1    12/2013

OTHER PUBLICATIONS

International Search Report issued in PCT/EP2015/062293, dated Sep. 15, 2015.
(Continued)

*Primary Examiner* — Levi Gannon
(74) *Attorney, Agent, or Firm* — RatnerPrestia

(57) ABSTRACT

A light unit driver comprising a plurality of light unit driver channels, each light unit driver channel being configured for driving a respective light unit via a respective light unit driver channel output of the light unit driver channel, —a supply rail that is connected to respective power inputs of the light unit driver channels to conduct electrical energy to the light unit driver channels, —a backup energy storage configured for storing electrical energy, —a control device for controlling the light unit driver, The backup energy storage is electrically connected to the light unit driver channel output of one of the light unit driver channels, the light units being connected to the light unit driver channel outputs of the remaining light unit driver channels. The control device is configured to: —in an operational mode, operate the one of the light unit driver channels to charge the backup energy storage via the one of the light unit driver channel outputs to which the backup energy storage is (Continued)

connected, and operate the remaining light unit driver channels to drive the light units, and—in an emergency mode, operate the one of the light unit driver channels to feed energy back to the supply rail to power the remaining light unit driver channels via the one of the light unit driver channels from the backup energy storage.

14 Claims, 3 Drawing Sheets

(51) Int. Cl.
    *H02J 7/02*     (2016.01)
    *H02J 7/00*     (2006.01)
    *H02M 1/00*     (2006.01)

(52) U.S. Cl.
    CPC .............. *H02J 9/061* (2013.01); *H02J 9/065* (2013.01); *H05B 33/0824* (2013.01); *H05B 33/0827* (2013.01); *H02M 2001/008* (2013.01)

(58) Field of Classification Search
    CPC ....... H02J 2009/068; H02M 2001/008; H02M 2001/009; H05B 33/0815; H05B 33/0824; H05B 33/0827
    See application file for complete search history.

(56) References Cited

U.S. PATENT DOCUMENTS

| | | |
|---|---|---|
| 2012/0091816 A1 | 4/2012 | Liu et al. |
| 2013/0106305 A1* | 5/2013 | Whitaker .................. G05F 3/02 |
| | | 315/210 |
| 2013/0147397 A1 | 6/2013 | McBryde et al. |
| 2016/0233712 A1* | 8/2016 | Kung .................... H02J 7/0072 |

OTHER PUBLICATIONS

International Preliminary Report on Patentability issued in PCT/EP2015/062293, dated Sep. 14, 2016.

* cited by examiner

LIGHT UNIT DRIVER SYSTEM

This application is a U.S. National Phase Patent Application of International Application No. PCT/EP2015/062293, filed Jun. 2, 2015, which claims priority to Netherlands Application No. NL 2012930, filed Jun. 2, 2014, the disclosures of which also are entirely incorporated herein by reference.

The invention relates to an light unit driver system comprising a backup energy storage and to a light unit illumination system comprising such a light unit driver system.

In illumination systems, in particular LED illumination systems, a backup may be used to allow the illumination system to be kept operational in the case of a power cut, an emergency or other causes. The backup is configured to store energy, and may commonly comprise a battery, a capacitor, a super capacitor or other energy storage. During normal operation, the backup may be charged and/or kept in charged form by for example a periodic recharging. In the case of a power cut or for any other reason, the backup may be operated to supply energy thereby being able to operate the illumination system.

The invention aims to provide an alternative backup configuration.

In order to achieve this goal, according to an aspect of the invention, there is provided a light unit driver system comprising:

- a light unit driver comprising a plurality of light unit driver channels, each light unit driver channel being configured for driving a respective light unit via a respective light unit driver channel output of the light unit driver channel,
- a supply rail that is connected to respective power inputs of the light unit driver channels to conduct electrical energy to the light unit driver channels,
- a backup energy storage configured for storing electrical energy,
- a control device for controlling the light unit driver, wherein the backup energy storage is electrically connected to the light unit driver channel output of one of the light unit driver channels, the light units being connected to the light unit driver channel outputs of the remaining light unit driver channels, the control device being configured to:

- in an operational mode, operate the one of the light unit driver channels to charge the backup energy storage via the one of the light unit driver channel outputs to which the backup energy storage is connected, and operate the remaining light unit driver channels to drive the light units, and
- in an emergency mode, operate the one of the light unit driver channels to feed energy back to the supply rail. Each light unit driver channel may comprise a respective direct current-direct current converter. The control device may be configured to, in the emergency mode, operate the remaining light unit driver channels to drive the light units powered via the one of the light unit driver channels from the backup energy storage. In other words, the control device may be configured, in the emergency mode, to power the remaining light unit driver channels via the one of the light unit driver channels from the backup energy storage The light unit driver comprises a plurality of channels, such as 4 channels. These channels are commonly used to each power a light unit. Each light unit may comprise an LED, a group of LEDs or any other light unit such as a halogen lamp. The light unit may further or instead comprise a light unit direction motor that directs the light unit in a direction of illumination, and/or a light unit focus motor that focusses the light unit. It is noted that where in the below reference is made to an LED, this is to be understood as possibly including any other type of light unit. In the case of the light units being LEDs or LED groups, different LEDs, such as different colour LEDs (e.g. red, green, blue and white) may be driven by different driver channels, thus being able to drive the different LEDs or groups of LEDs independently from each other so as to obtain a desired light output (e.g. a desired colour). The LEDs or LED groups are connected to respective outputs of the LED driver channels. The control device controls the driver channels to operate at a desired output power and/or duty cycle, so as to provide a desired intensity for each LED or LED group.

In an embodiment, one of the light unit driver channels is applied to charge the backup energy storage. Thereto, the backup energy storage is electrically connected to an output of one of the light unit driver channels. The control device (also identified as a control unit) drives the corresponding light unit driver channel so as to charge the backup energy storage. Light units may be connected to the remaining light unit driver channels so as to drive the light units by the remaining light unit driver channels. In the case of an emergency, power cut, etc., the control device operates the light unit driver channel to which the backup energy storage is connected to conduct energy back from the backup energy storage to the supply rail, so as to operate the light units connected to the other light unit driver channels from the backup energy storage. Conducting back energy from the backup energy storage may be performed by the control device controlling the one driver channel to which the backup energy storage is connected to remain in a conductive mode. Thereto, the control device may stop a periodic switching of a DC/DC converter comprised in the driver channel, thus stopping a periodic charging/discharging of an inductor in the driver channel. The circuit of the driver channel may thereby conduct energy back to the supply rail (e.g. via the inductor). A switch of the driver that is series connected with the inductor may be bypassed passively by a reverse polarity diode, or may be actively kept in conducting state by the control device. In normal operation, the supply rail may be fed from a mains, a rectified mains, a rectified and DC/DC converted mains, an AC/DC converted mains, or any other suitable supply. The backup energy storage may comprise a battery, a (super) capacitor or any other suitable energy storage. The control device may comprise a microcontroller, such as an embedded microcontroller, or any other suitable control device. In an embodiment, the control device comprises a plurality of local control devices, e.g. a local control device per driver unit, the local control devices being interconnected by any suitable communication means and cooperatively providing the functionality of the control device as described, A backup may be provided at each driver so as to enable the drivers to operate autonomously, even in case a (power and/or control) connection to a system in which it is embedded, would be lost. In that case, a relatively small backup capacity could be provided per driver (e.g. a capacitor, super capacitor, backup battery, etc.). Alternatively, a plurality of driver s could be connected to a same supply. In such situation, one or a subset of the driver s may be provided with the backup as described, allowing to use for illumination a subset of the driver channels. In such a configuration, the plurality of light unit drivers could all be connected to the same supply rail.

The illumination system may be an illumination system for any purpose, such as in a building, outdoor, in a vehicle, etc.

The light unit, supply rail and control device may be separate devices. Alternatively, two or more of these devices may be integral to form a single device (e.g. a single electronic module such as a single circuit board, a single integrated circuit, etc.). For example, the light unit driver and supply rail may be integral. As another example, the control device may be integral with the light unit driver (and optionally the supply rail) to form a single device.

In an embodiment, the control device is configured to transmit configuration data to the backup energy storage and/or to receive configuration data from the backup energy storage, and to control the light unit driver channel to which the backup energy storage is connected in accordance with the configuration data. The configuration data may contain information identifying that a backup is connected to one of the light unit driver channels, that the system operates in operation mode or in emergency mode, information about a charging state of the backup, etc. The backup energy storage may be provided with its own backup energy storage controller so as to process, receive and/or transmit configuration data.

In order to transmit and/or receive the configuration data, in an embodiment, the control device is configured to transmit and/or receive the configuration data via the light unit driver channel output. No additional connection is needed, so that no or no further (e.g. hardware) modification of the light unit driver channel that drives the backup energy storage, will be required. The control device may be configured to transmit configuration data to the backup energy storage by modulating an output voltage of the light unit driver channel to which the battery backup is connected. The modulation may be performed by pulsing the output voltage, temporarily changing an output voltage value, or any other suitable modulation technique. The backup energy storage may be configured to transmit configuration data to the control device by modulating a load formed by the backup energy storage, the control device being configured to receive the configuration data from a measurement of a modulation of the load (e.g. using existing current measurement hardware as provided in the light unit driver channel so that no additional hardware may be required). Alternatively, or in addition to the above, the light unit driver system may be configured to transmit and/or receive the configuration data via a data communication connection (such as a serial data communication line) between the control device and the backup energy storage.

The configuration data may for example comprise:
a maximum battery charging current of the battery
a charge duration at a certain battery charging current
a battery capacity
a battery nominal voltage
a battery nominal discharge current
a battery charging method (e.g. continuous, intermittent or trickle charging)
a battery full detection level (f.e. a voltage level)
Battery maintenance data, such as
    battery module brand; battery module type; battery module serial number
    battery brand; battery type; battery serial number In an embodiment, the control device is configured to operate the light unit driver channel to which the backup energy storage is connected in a voltage output mode so as to provide a charging voltage to the backup energy storage instead of providing a current drive as may be used with the light unit s. Thereto, the control device may be configured to drive the driver channel so as to operate in a voltage type of feedback using a feedback obtained from an output voltage sensor (e.g. a resistor or voltage divider).

In an embodiment, the control device is configured to operate the remaining light unit driver channels in a current output mode.

In an embodiment, each driver channel comprises a switching type converter comprising an inductor, the driver channel to which the backup energy storage is connected comprises a bypass switch, connected in parallel to the inductor, the light unit driver system being configured to close the bypass switch in the emergency mode. Thus, the inductor (and possibly a switch, e.g. a field effect transistor or other semiconductor switch in series with the inductor) may be short circuited thus reducing a voltage drop in the one driver channel. The bypass switch may be comprised in the driver channel, the control device being configured to perform said closing of the bypass switch in the emergency mode. Alternatively, the bypass switch may be comprised in the backup energy storage, an extra connection being provided from the bypass switch of the backup energy storage to the supply rail, the control device of the backup energy storage being configured to perform said closing of the bypass switch in the emergency mode. Thus, in this respect a hardware modification of the driver channel itself to enable the low loss feeding back of energy may be omitted.

In an embodiment, the backup energy storage comprises a direct current-direct current converter, a backup energy storage battery, and a backup energy storage controller that is configured to control the direct current-direct current converter. The backup energy storage controller controls the direct current-direct current converter to charge and discharge the battery. In an embodiment, the direct current-direct current converter is a bidirectional direct current-direct current converter. In another embodiment, the direct current-direct current converter may be configured and connected for generating a charging voltage for charging the battery, the backup energy storage may comprise a switch to bypass the direct current-direct current converter in order for the battery to supply energy in the emergency mode.

According to another aspect of the invention, there is provided a light unit illumination system comprising a plurality of light units and a light unit driver system according to the invention, wherein the light units are connected to respective light unit driver channel outputs of the light unit driver system. The backup energy storage is connected to one of the light unit driver channel outputs. The light units are connected to the remaining light unit driver channel outputs. The light units may each comprise at least one LED.

The invention will further be illustrated based on the appended drawing, showing a non-limiting embodiment, wherein:

FIG. 1 depicts a circuit diagram, partly in block schematic form, of an illumination system according to an embodiment of the invention. It is noted that, where in the below, reference is made to an LED, any other light unit (such as a halogen light unit) may be applied instead.

Figure 1:
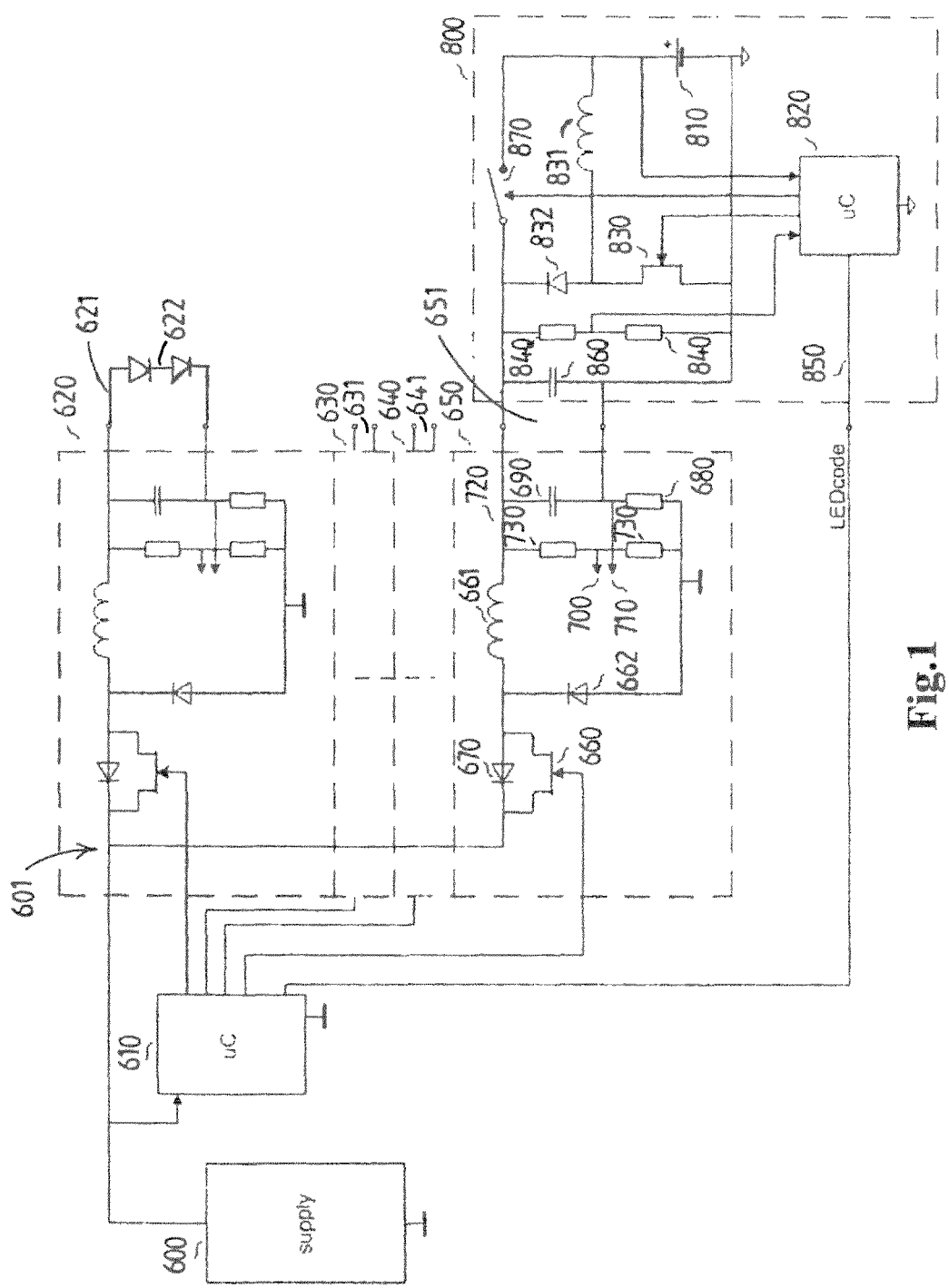
FIG. 1 depicts a highly schematic circuit diagram of an illumination system in accordance with an embodiment of the invention.

A supply 600 such as a AC/DC converter that is powered from a mains network, supplies electrical energy to a supply rail 601. An LED driver 620 is connected to the supply 600 to be powered thereby. The LED driver 620 comprises LED driver channels 620, 630, 640 and 650, each comprising an LED driver channel output 621, 631, 641 and 651 respectively, to which a respective LED or LED group (such as LED group 622) may be connected. It is noted that, in this document, the term LED forms an abbreviation for light emitting diode. It is noted that other loads may be provided as well, such as other light sources, (e.g. halogen) and/or auxiliary components of a lighting system such as a cooling fan, a motorized light directing device, a motorized light focusing device. The LED driver channels 630 and 640 may comprise a similar circuit diagram as depicted in the case of the LED driver channels 620 and 650.

Referring to the drawing illustrating respective components in driver 650, each of the LED driver channels comprises a DC/DC converter comprising switch (e.g. field effect transistor) 660, inductor 661, reverse diode 662 forming a switching DC/DC converter circuit topology. A reverse protection diode may be provided in parallel to switch 660. A power supply input connects the switch 660 to the supply rail 601. An output voltage feedback signal 700 may be provided by voltage divider 730 connected in parallel to the driver channel output 651. An output current feedback signal 710 may be provided by series resistor 680 connected in series with the driver channel output 651. Output capacitor 690 buffers the driver channel output 651.

The other driver channels 620, 630, 640 may exhibit a same or similar circuit topology.

Although the example depicts a driver having 4 driver channels, any other number of driver channels, 2, 3, 5, 6, 7, 8, 9, 10, 100, 1000, or any other number, may be provided.

The driver channels are each controlled by control device 610, such as a microcontroller. The control device thereto—in this example—drives the respective switches, such as switch 660 in the driver channel 650 to control the driver output voltage and/or current. Feedback may be provided to the control device in a form of the voltage feedback signal 700 and the current feedback signal 710 as described above.

The backup energy storage 800 in this example comprises battery 810, a backup energy storage control device 820 and a directional direct current/direct current converter. The converter comprises switch 830, inductor 831 and diode 832. Feedback signals may be provided to the backup storage control device in a form of a battery voltage and a driver channel output voltage obtained from voltage divider 840.

The driver control device 610 and the backup energy storage control device 820 may communicate with each other to exchange configuration data. The data communication may take place via a separate connection line 850 (forming e.g. a serial bus) or by means of power line communication via the LED driver channel output, an example of which will be described below.

Thus, in this embodiment one of the LED driver channels 650 is used to charge the battery 810. To that end the LED driver channel 650 may be operated in voltage mode as opposed to the current mode it may be operated in when used as a channel to supply an LED or an LED group. Voltage mode is achieved by using the forward voltage (720) detection circuit 730 delivering voltage feedback signal 700 as feedback signal to the control device 610 to form a control loop. The output capacitor 690 may be small to enable sufficient dynamic behavior in current mode, but, when in voltage mode, it is sufficiently large to maintain a sufficiently constant voltage for charging the battery. Should it be insufficient, it can be enlarged by placing capacitor 860 in parallel as explained later.

The backup energy storage control device 820 will co-operate with the control device 610 of the driver 620 to switch from an operational mode to an emergency mode. For example, the driver control device 610 may send data to the backup energy storage control device 820 to inform the backup energy storage control device 820 about a mode of operation (operational mode or emergency mode), for example in response to detecting an absence of sufficient supply at the supply rail 601 (eg. A low voltage at supply rail 601.

In operational mode, supply 600 will deliver the supply power to the driver, the driver will power the LEDs via its driver channels 620, 630, 640 not involved in charging the battery and its channel 650 is used to charge battery 810 and/or maintain battery 810 sufficiently charged. Controller 820 will be aware of the standard operational mode via connection 850 (f.e. using a so called LEDcode interface) or via LED power line communication.

During operational mode of the driver, supply 600 delivers the main supply to the driver's control device 610. Control device 610 will signal control device 820 that power is available and that it can enable charging by closing switch 870 (which may be an FET or alike electrically connected between the battery 810 and the driver channel output 651. Control device 610 will provide the driver channel 650 to generate a charging voltage at line 720 which connects to the driver channel output 651. The control device 820 will monitor the battery's charge status through measuring the battery voltage and possibly it's current. In an embodiment, the control device 820 does not measure the charge current, however instead the charge current is communicated to the control device 820 by the control device 610, as control device 610 already has the availability of current measurement via the standard LED driver channel's ability to measure current via current measurement series resistor 680 (or alike methods).

Other examples of configuration data may be communicated. For example, a battery status; life estimation, replacement status, type, etc. etc. may be communicated by the control device 820 to control device 610 which can further communicate it to a central management entity, for example for planning maintenance/replacement.

The configuration data may for example comprise:
  a maximum battery charging current of the battery
  a charge duration at a certain battery charging current
  a battery capacity
  a battery nominal voltage
  a battery nominal discharge current
  a battery charging method (e.g. continuous, intermittent or trickle charging)
  a battery full detection level (f.e. a voltage level)
  Battery maintenance data, such as
    battery module brand; battery module type; battery module serial number
    battery brand; battery type; battery serial number During operational mode, control device 610 will be supplied from a supply circuit connected to the supply-rail 601. An additional buffer such as a capacitor, may be provided to temporarily supply the control device during a changeover from operational mode to emergency mode. Controller 820 will be supplied from the battery 810.

In emergency mode, power by supply 600 is no longer delivered to the supply rail 601. This will be notified by the control device 610 to the control device 820 via connection 850, or the control device 820 may detect this from vanishing voltage at the driver channel output 651 via voltage divider 840.

Control device 820 will open switch 870 and will start controlling the switch 830 that forms part of the DC/DC converter in the backup energy storage, so that the voltage of the battery (f.e. 12V) is boosted to a required supply voltage for lighting the LEDs under emergency conditions. This voltage may be f.e. up to 60V.

The voltage at the driver channel output 651 may then be determined by a control by the control device 820 of the switch 830 and will be measured via the voltage divider formed by resistors 840.

The voltage at the driver channel output 651 may be delivered to the supply rail 601 of the driver via the internal diode of FET 670.

The control device 610 is aware of the emergency condition as it has detected that power from supply 600 is gone. After signaling this to control device 820 or immediately when control device 820 is self-detecting the emergency condition, control device 610 may drive the switch 660 in conduction mode to bypass diode 670 for a.o. lower series impedance. Control device 610 may also adapt the LED driving conditions to the configured emergency requirements, (f.e. fixed time at lowered intensity; fixed lower intensity for as long as battery charge permits; gradually diminishing intensity depending on remaining battery charge; starting at normal intensity for certain time A and then fall back to lower intensity; etc.).

When in emergency mode, the control device 820 may be supplied from battery 810; the control device 610 may in operational mode be supplied from the supply-rail 600. It is also possible to supply the control device 610 (e.g. in emergency mode) from the backup energy storage, for example by the control device 610 drawing its supply from the rail 610 that is powered in emergence conditions from the battery. As mentioned above, an additional buffer such as a capacitor, may be provided to temporarily supply the control device during a changeover from operational mode to emergency mode.

While in emergency mode, the emergency requirements/regime may be set by the control device 610 such that only selected channels will be powered, or that certain channels will light with full intensity while others are dimmed to an emergency intensity etc. This can be done using the standard abilities of the driver via the FETs like 660 in each driver channel.

A principle that drives the boost converter is the tendency of an inductor to resist changes in current by creating and destroying a magnetic field. In a boost converter, the output voltage is always higher than the input voltage.

(a) When the switch 830 is closed, current flows through the inductor 830 in the direction from right to left in the figure and the inductor stores some energy by generating a magnetic field. Polarity of the right side of the inductor is positive.

(b) When the switch 830 is opened, current will be reduced as the impedance is higher. The magnetic field previously created will be destroyed to maintain the current flow towards the load via diode 830 to capacitor 860 and the driver (wire 720 to inductor 660 via diode 670/FET660) to the supply rail in the driver and via the other channels finally to the LEDs). Thus the polarity across inductor 830 will be reversed (means left side of inductor will be negative now). As a result two sources (battery 810 and inductor 830) will be in series causing a higher voltage to charge the capacitor 860 through the diode 830.

If the switch 830 is cycled fast enough, the inductor will not discharge fully in between charging stages, and the load will always see a voltage greater than that of the input source alone when the switch is opened. Also while the switch is opened, the capacitor 860 in parallel with the load is charged to this combined voltage. When the switch 830 is then closed and the left hand side is shorted out from the right hand side, the capacitor 860 is therefore able to provide the voltage and energy to the load. During this time, the blocking diode 830 prevents the capacitor 860 from discharging through the switch 830. The switch 830 must of course be opened again fast enough to prevent the capacitor from discharging too much.

Figure 2:
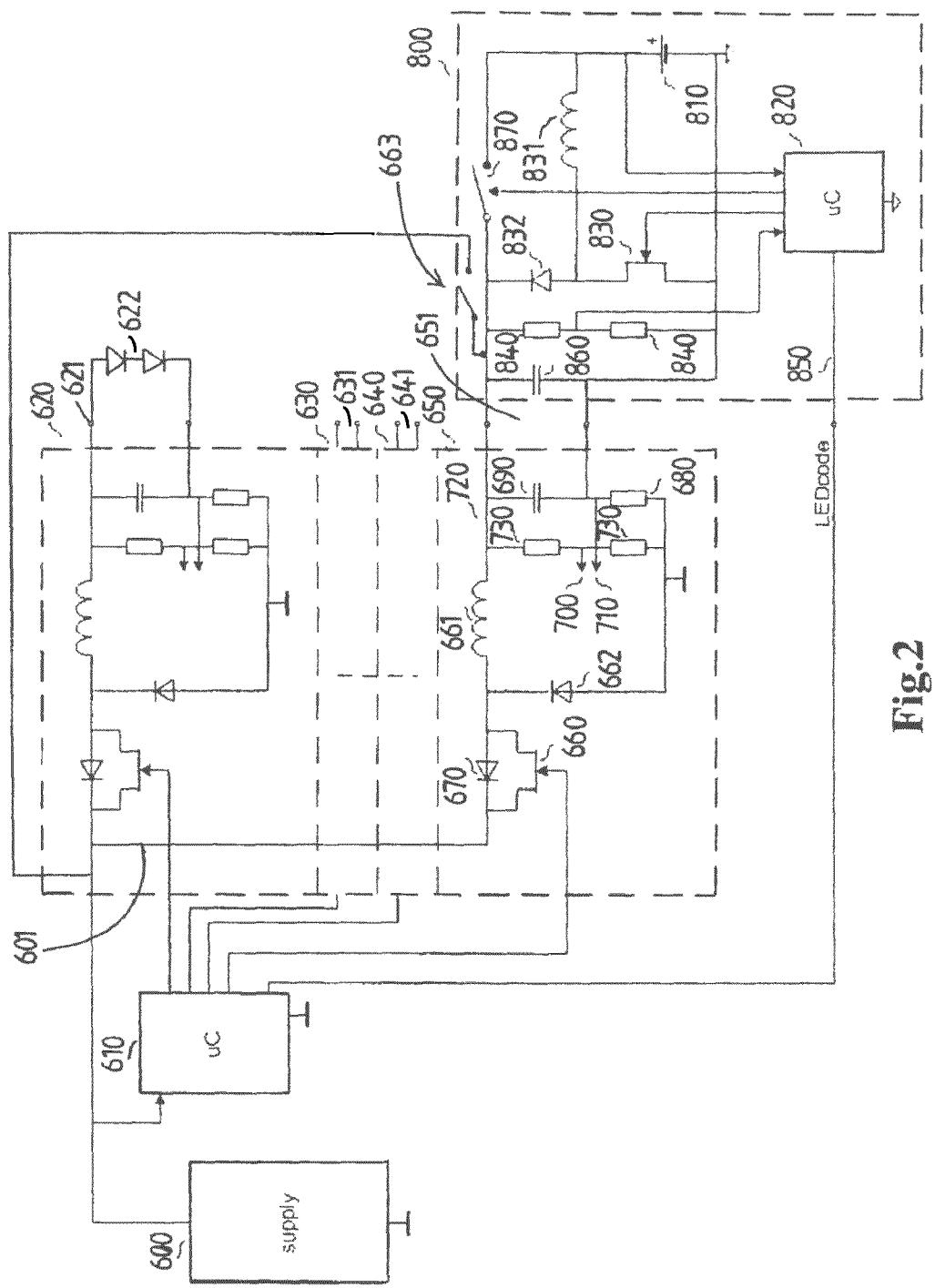
FIG. 2 depicts a highly schematic circuit diagram of an illumination system in accordance with a further embodiment of the invention.

FIG. 2 depicts a highly schematic circuit diagram of an illumination system in accordance with another embodiment of the invention. The same reference numerals refer to the same or similar components, and the description above in respect of FIG. 1 generally applies to the FIG. 2 embodiment also. Measures can be taken to prevent inductor 660 to negatively influence this boost converter operation. Besides dimensioning the component values, such as the size of capacitor 860, and boost converter frequency, as an example, the inductor 660 may be short circuited using an extra switch 663 f.e. an FET, across inductor 661. The supply current from the backup energy storage may flow through the inductor 661 and either the switch 660 when driven in closed state by the control device 610 or the reverse diode 662 in accordance with the FIG. 1 embodiment. Alternatively, the inductor 661, reverse diode 662 and switch 660 may be bridged by a switch 663 in accordance with the FIG. 2 embodiment. This would cause an extra component in the driver and it would make the channel to be used for emergency battery operation a special channel. In order to avoid this, as depicted in FIG. 2, the supply rail 601 may be connected via an extra terminal to the backup energy storage 800 and the switch 663 may be comprised in the backup energy storage 800.

In a further embodiment, not depicted, the battery may be electrically connected to the driver channel output without the interposition of a DC/DC converter. In that case, the supply rail may supply the remaining driver channels from the battery voltage directly. In this case the driver channel 650 may be driven by the control device 610 to charge the battery, using current feedback and voltage feedback as explained above. A controlling of the charging and discharging of the battery would in such embodiment be provided by the control device 610.

In a still further embodiment, the direct current/direct current converter in the backup energy storage may be implemented as bi-directional converter, thus enabling to convert a driver channel output voltage into a charging voltage and vice versa.

Figure 3:
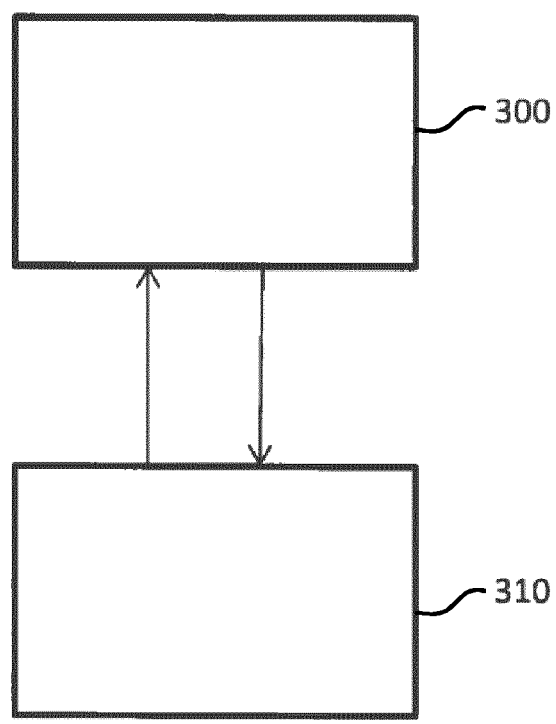
FIG. 3 depicts a flow diagram to illustrate an operation of the illumination system in accordance with FIGS. 1 and 2.

FIG. 3 depicts a flow diagram to illustrate an operation of the control device 610 as depicted in FIGS. 1 and 2. In the operational mode (represented by state 300), the control device 610 operates the one of the LED driver channels to charge the backup energy storage via the one of the LED driver channel outputs to which the backup energy storage is connected, and in the emergency mode (represented by state 310), the control device 610 operates the one of the LED driver channels to feed energy back from the backup energy storage to the supply rail to power the remaining LED driver channels via the one of the LED driver channels from the backup energy storage.

The invention claimed is:

1. A light unit driver system comprising:
   a light unit driver comprising a plurality of light unit driver channels, each light unit driver channel comprising a switching type converter comprising an inductor,
   a supply rail that is connected to respective power inputs of the light unit driver channels to conduct electrical energy to the light unit driver channels,
   a backup energy storage configured for storing electrical energy,
   a control device for controlling the light unit driver,
   wherein each light unit driver channel comprises a respective light unit driver channel output, each light unit driver channel being configured for driving a respective light unit via the respective light unit driver channel output of the light unit driver channel,
   wherein the backup energy storage is electrically connected to the light unit driver channel output of one of the light unit driver channels to be charged via the light unit driver channel output of the one of the light unit driver channels, the light units being connected to the light unit driver channel outputs of the remaining light unit driver channels,
   wherein the one of the light unit driver channels, of which the light unit driver channel output is connected to the backup energy storage, is operable to conduct energy back from its light unit driver channel output to the supply rail,
   and wherein the control device is configured to:
   in an operational mode, operate the one of the light unit driver channels to charge the backup energy storage via the one of the light unit driver channel outputs to which the backup energy storage is connected, and operate the remaining light unit driver channels to drive the light units, and
   in an emergency mode, operate the one of the light unit driver channels to feed energy back from the backup energy storage, via the light unit driver channel output of the one of the light unit driver channels, to the supply rail, and operate the remaining light unit driver channels to drive the light units powered via the one of the light unit driver channels from the backup energy storage.

2. The light unit driver system according to claim 1, wherein the control device is configured to transmit configuration data to the backup energy storage and/or receive configuration data from the backup energy storage and to control the light unit driver channel to which the backup energy storage is connected in accordance with the configuration data.

3. The light unit driver system according to claim 2, wherein the control device is configured to transmit and/or receive the configuration data via the light unit driver channel output.

4. The light unit driver system according to claim 3, wherein the control device is configured to transmit configuration data to the backup energy storage by modulating an output voltage of the light unit driver channel to which the battery backup is connected.

5. The light unit driver system according to claim 3, wherein the backup energy storage is configured to transmit configuration data to the control device by modulating a load formed by the backup energy storage, the control device being configured to receive the configuration data from a measurement of a modulation of the load.

6. The light unit driver system according to claim 2, comprising a data communication connection between the control device and the backup energy storage, and being configured to transmit and/or receive the configuration data via the data communication connection between the control device and the backup energy storage.

7. The light unit driver system according to claim 1, wherein the control device is configured to operate the light unit driver channel to which the backup energy storage is connected in a voltage output mode.

8. The light unit driver system according to claim 7, wherein the control device is configured to operate the remaining light unit driver channels in a current output mode.

9. The light unit driver system according to claim 1, wherein each driver channel comprises a switching type converter comprising an inductor, the driver channel to which the backup energy storage is connected comprises a bypass switch, connected in parallel to the inductor, the light unit driver system being configured to close the bypass switch in the emergency mode.

10. The light unit driver system according to claim 9, wherein the bypass switch is comprised in the driver channel, the control device being configured to perform said closing of the bypass switch in the emergency mode.

11. The light unit driver system according to claim 9, wherein the bypass switch is comprised in the backup energy storage, the control device being configured to perform said closing of the bypass switch in the emergency mode.

12. The light unit driver system according to claim 1, wherein the backup energy storage comprises a direct current-direct current converter, a backup energy storage battery, and a backup energy storage control device that is configured to control the direct current-direct current converter.

13. A light unit illumination system comprising a plurality of light units and a light unit driver system according to claim 1, wherein the light units are connected to respective light unit driver channel outputs of the light unit driver system.

14. The light unit illumination system according to claim 13, wherein the light units each comprise at least one LED.

* * * * *